US007907198B2

(12) United States Patent
Tognazzini

(10) Patent No.: US 7,907,198 B2
(45) Date of Patent: Mar. 15, 2011

(54) ADVANCED ELECTRONIC STILL IMAGE VIEWFINDERS

(75) Inventor: Bruce Tognazzini, Woodside, CA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 11/221,680

(22) Filed: Sep. 7, 2005

(65) Prior Publication Data

US 2006/0055803 A1    Mar. 16, 2006

Related U.S. Application Data

(63) Continuation of application No. 08/671,294, filed on Jul. 1, 1996, now abandoned.

(51) Int. Cl.
*H04N 5/222* (2006.01)
(52) U.S. Cl. ................ 348/333.01; 348/333.02
(58) Field of Classification Search .......... 348/333, 348/231, 244, 299, 255, 203, 362, 333.01, 348/333.02; 386/77; 396/387; 356/404
See application file for complete search history.

(56) References Cited

U.S. PATENT DOCUMENTS

| 4,660,092 A | 4/1987 | Nutting |
| 4,739,409 A | 4/1988 | Baumeister |
| 4,754,333 A | 6/1988 | Nara |
| 4,814,811 A * | 3/1989 | Saito et al. .......... 396/387 |
| 4,887,161 A | 12/1989 | Watanabe |
| 5,017,014 A * | 5/1991 | Terashita .......... 356/404 |
| 5,023,646 A | 6/1991 | Ishida |
| 5,027,214 A | 6/1991 | Fujimori |
| 5,040,068 A | 8/1991 | Parulski et al. |
| 5,130,813 A * | 7/1992 | Oie et al. .......... 386/77 |
| 5,161,025 A | 11/1992 | Nakao |
| 5,164,751 A | 11/1992 | Weyer |
| 5,164,833 A | 11/1992 | Aoki |
| 5,239,419 A | 8/1993 | Kim |
| 5,496,106 A * | 3/1996 | Anderson .......... 348/255 |
| 5,646,683 A * | 7/1997 | Motta .......... 348/203 |
| 5,734,427 A | 3/1998 | Hayashi |
| 6,806,907 B1 * | 10/2004 | Tamura .......... 348/362 |

FOREIGN PATENT DOCUMENTS

EP    0 707 419    4/1996

OTHER PUBLICATIONS

European Search Report dated Aug. 11, 1998, from counterpart Application No. 97110815.4.

* cited by examiner

*Primary Examiner* — Allen Wong
(74) *Attorney, Agent, or Firm* — Marsh Fischmann & Breyfogle LLP; Kent A. Lembke; David L. Stewart

(57) ABSTRACT

A video image pickup and display are used to provide electronic viewfinders for cameras. Black and white displays permit a photographer to see interactively the impact of camera adjustment on a resulting image. They also permit a photographer to visualize a black and white rendition of a color scene, when shooting in black and white film. The electronic display permits image processing results to be viewed either during calculations or by simulation. Techniques are disclosed for film and electronic storage media for still and for motion cameras and for color and black and white cameras.

23 Claims, 10 Drawing Sheets

ADVANCED ELECTRONIC STILL IMAGE VIEWFINDERS

This is a continuation of application Ser. No. 08/671,294, filed Jul. 1, 1996 now abandoned which is incorporated herein by reference.

BACKGROUND OF THE INVENTION

1. Field of the Invention

The invention relates to still and motion picture cameras, including VCRs, and more particularly to cameras which provide a black and white viewfinder.

2. Description of Related Art

The field of photography has a long and colorful history, characterized by constant innovation and development and the long exposure times and pyrotechnics of the past have been replaced by digital cameras and camcorders. Optical viewfinders permit a photographer to see a representation of the image which will be captured on film when a photograph is taken. In some cameras, viewfinders have followed a separate optical path from that of the image for the film. Single lens reflex cameras have been developed which permit a viewer to see in an optical viewfinder the same image that would be projected upon the film when the picture was snapped.

Motion cameras have included cameras for film and TV. In addition, consumer video cameras have become widely distributed.

Early color television cameras featured black and white electronic viewfinders, mainly because the cost of a color display was significant in comparison to the cost of a color electronic target for capturing a color image. Thus, economics dictated that a lower cost black and white viewfinder display the image which was being captured on a color target.

The Problems

Photographers working in or learning to work in black and white (either using film or electronic still cameras) face the problem of seeing the world in color, then having to mentally translate it into black and white. Typically, the number of settings actually implemented on a camera have been less than the number of possible settings, perhaps in part due to the fact that the more variables that are introduced, the more difficult it is for a photographer to maintain a mental model of the impact of changes upon the ultimate image produced on film or on an electronic medium.

The prior art does not offer electronic viewfinders on still cameras and particularly not a black and white electronic viewfinder. Further, the prior art does not appear to have offered electronic viewfinders on any type of film camera, still or motion. Further, the prior art does not offer a black and white option for color viewfinders to enable a photographer to work in black and white.

SUMMARY OF THE INVENTION

The invention consists, in its simplest form, of a camera mated to a display reproducing the image seen by the camera in black and white, enabling black and white photographers to get a better idea about what their true results will be. The term "viewfinder" as used in this disclosure, refers to both "peek through the camera" viewfinders as well as flat panels that are associated with the camera and viewed by the photographer from a distance.

The invention finds its expression in seven sample embodiments which apply the principles of the invention in specific ways.

The invention relates to a camera having a viewfinder including an electronic target for capturing images in electronic form, and a display for displaying images from the electronic target to a user. The electronic target may be black and white or color. Similarly, the display may be a black & white display or a color display. Images may be stored in color but tagged for display in black and white. Viewfinder images may be obtained through the same lens used to capture images or through a different lens. Images can be stored on film or electronically. The same image target can be used for the viewfinder as is used for image storage. In one form of the invention, the electronic target and display are modular for easy replacement as a unit.

The invention also relates to an electronic back for mounting to a camera body, including an electronic target for capturing images in electronic form for storage and for display, and a display for displaying images from the electronic target to a user.

The invention also relates to a computer controlled camera, including a computer controlling at least one of shutter speed and aperture during the capture of optical images using the camera in response to camera control settings, one or more image targets for converting an optical image into an electronic image, and a viewfinder display displaying an image from an image target. The computer is configured to perform image processing on the electronic image to create a processed image for storage. The processed image is displayed on the viewfinder display. The camera is equipped with a magnify function and a persistence function.

The invention also relates to a method of using a computer controlled camera, by capturing an image in electronic form, displaying the image, and modifying the image as it is displayed to reflect changes to the image occurring as a result of image processing.

The invention also relates to a method of using a computer controlled camera, by capturing an image in electronic form, displaying the image, and modifying the image as it is displayed to simulate how the image would appear upon completion of image processing.

The invention also relates to a method of storing images in a computer controlled camera, by storing the images as color images, and tagging at least one image for conversion to black and white upon display.

The invention also relates to computer program products for carrying out the techniques of the invention.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
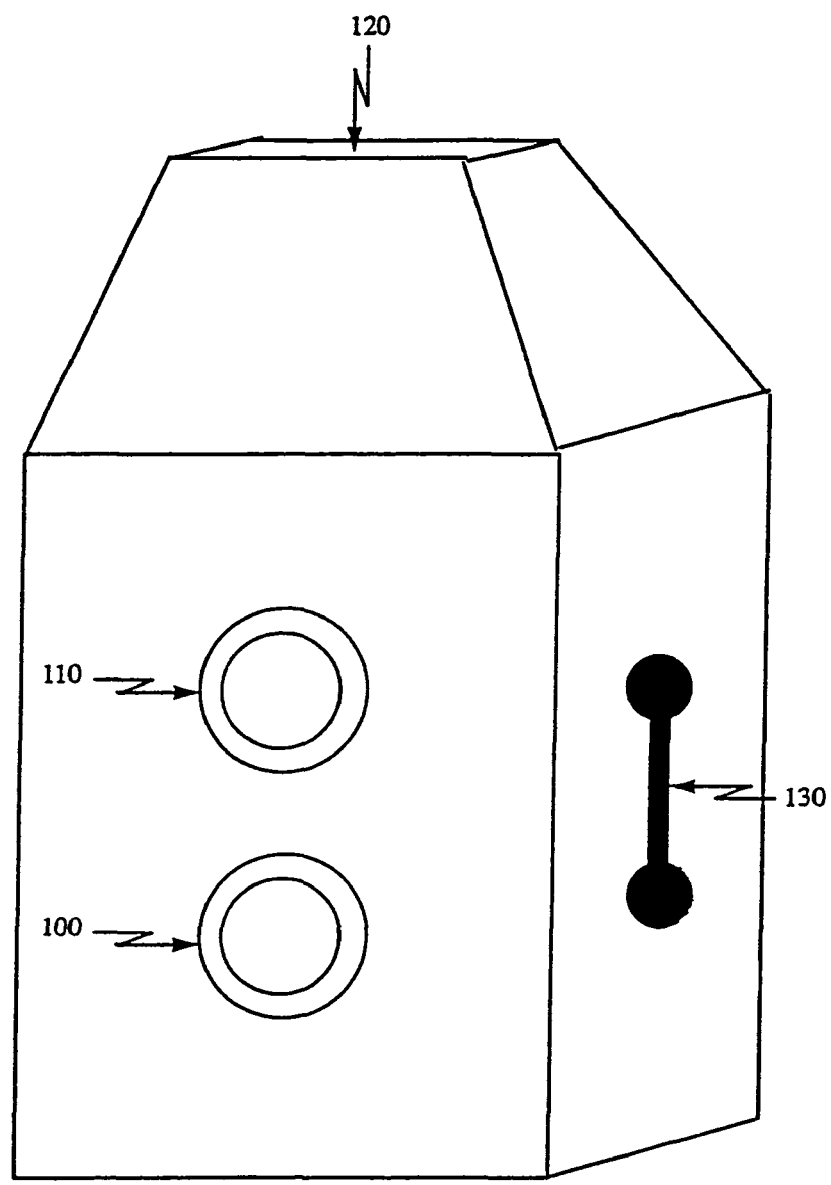
FIG. 1 is a perspective view of a-camera having a separate optical path for a viewfinder.

FIG. 1 is a perspective view of a camera having a separate optical path for a viewfinder in accordance with the invention. The camera has a main image lens 100 which is utilized to capture and focus onto the image plane the image to be photographed. The camera also has a separate viewfinder lens 110 which is utilized to permit the viewer to see a close replica of the image seen through main image lens 100. The image from the viewfinder lens 110 is captured electronically and displayed on an internal display which can be viewed through viewport 120 when using the camera. A film advance 130 is utilized to advance the film from frame to frame if film is utilized as the recording medium.

Figure 2:
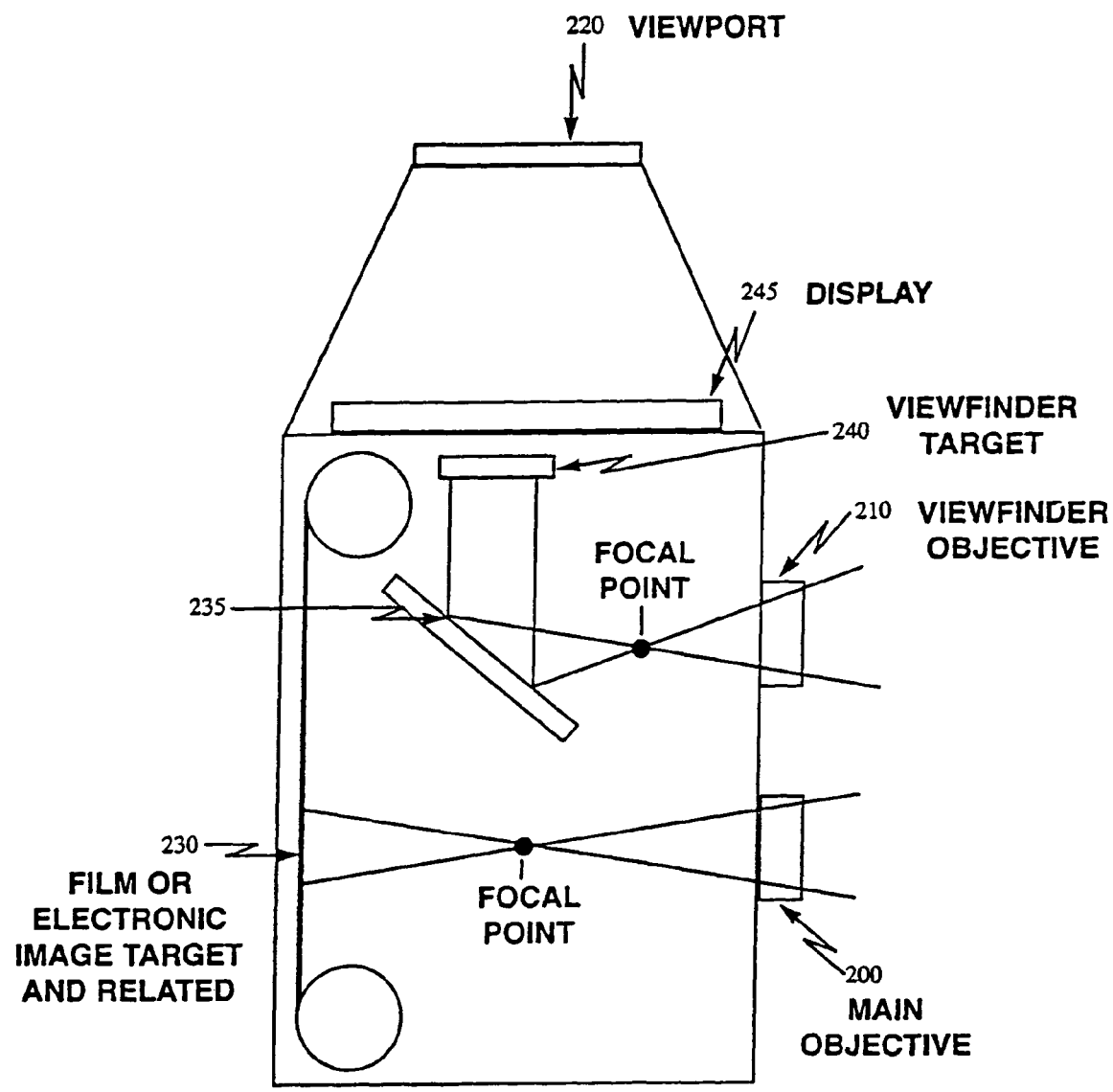
FIG. 2 is a cut away view of the internal components of the camera of FIG. 1.

FIG. 2 is a cut away view of the internal components of the camera of FIG. 1. A film implementation, an image captured by main image lens 200 is projected onto an image plane 230 where a frame of film is waiting to be exposed. Alternatively, an electronic image target is provided at 230 if a digital camera is being implemented. The electronic image target captures the image, in a digital mode, and stores it in internal memory within the camera.

The image through the viewfinder lens 210, is reflected on mirror 235 and projected upwardly onto a viewfinder image target 240 where the optical image is converted into an electronic image for display on display 245. The image on display 245 can then be viewed through viewport 220. The image targets are essentially the same image pick up devices utilized in television cameras.

More information about the particular characteristics of image targets and their associated displays will be given in the discussion of the sample embodiments of the invention hereinafter.

Figure 3:
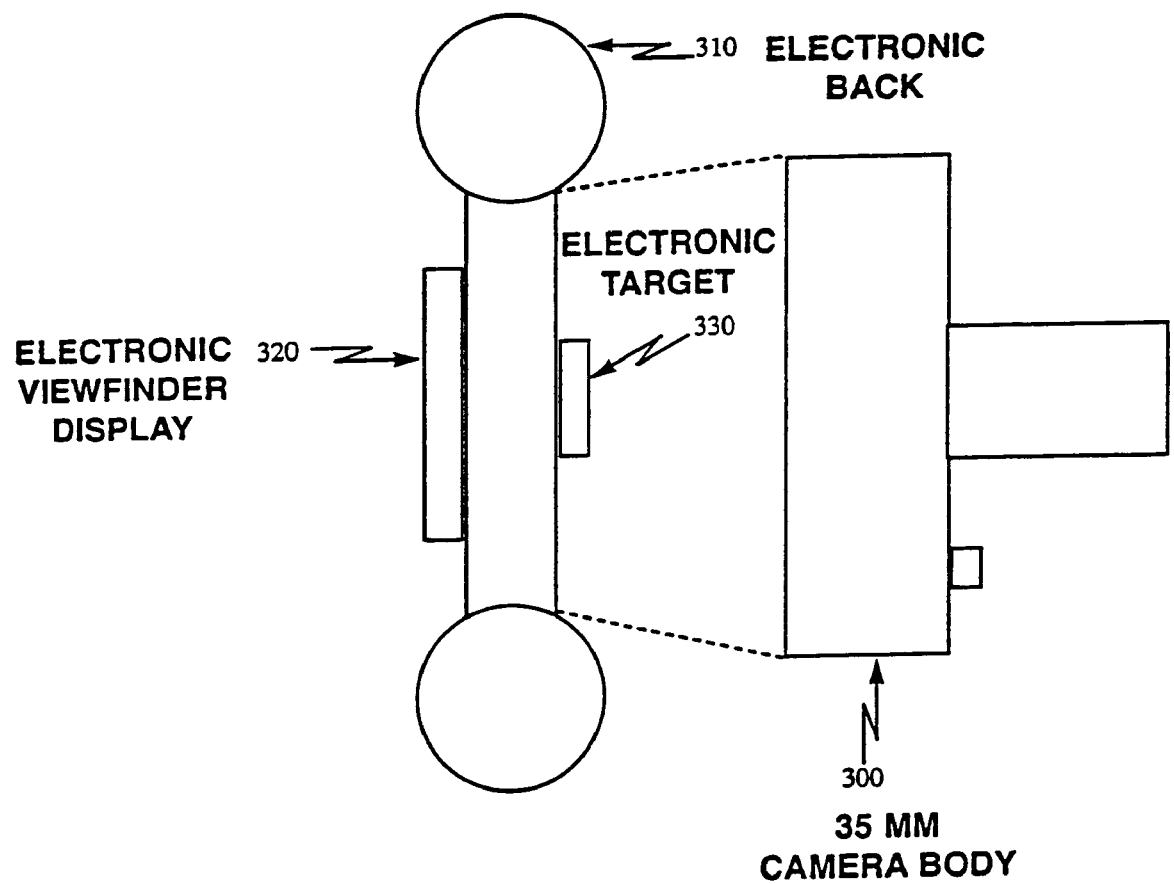
FIG. 3 is an illustration of a 35 mm camera having a removable electronic back for capturing digital images.

FIG. 3 is an illustration of a 35 mm camera having a removable electronic back for capturing digital images. As shown in FIG. 3, a 35 mm camera body is constructed as to permit a removable back to be attached. In FIG. 3, an electronic back 310 is shown as it is being installed on the 35 mm camera body 300.

Figure 4:
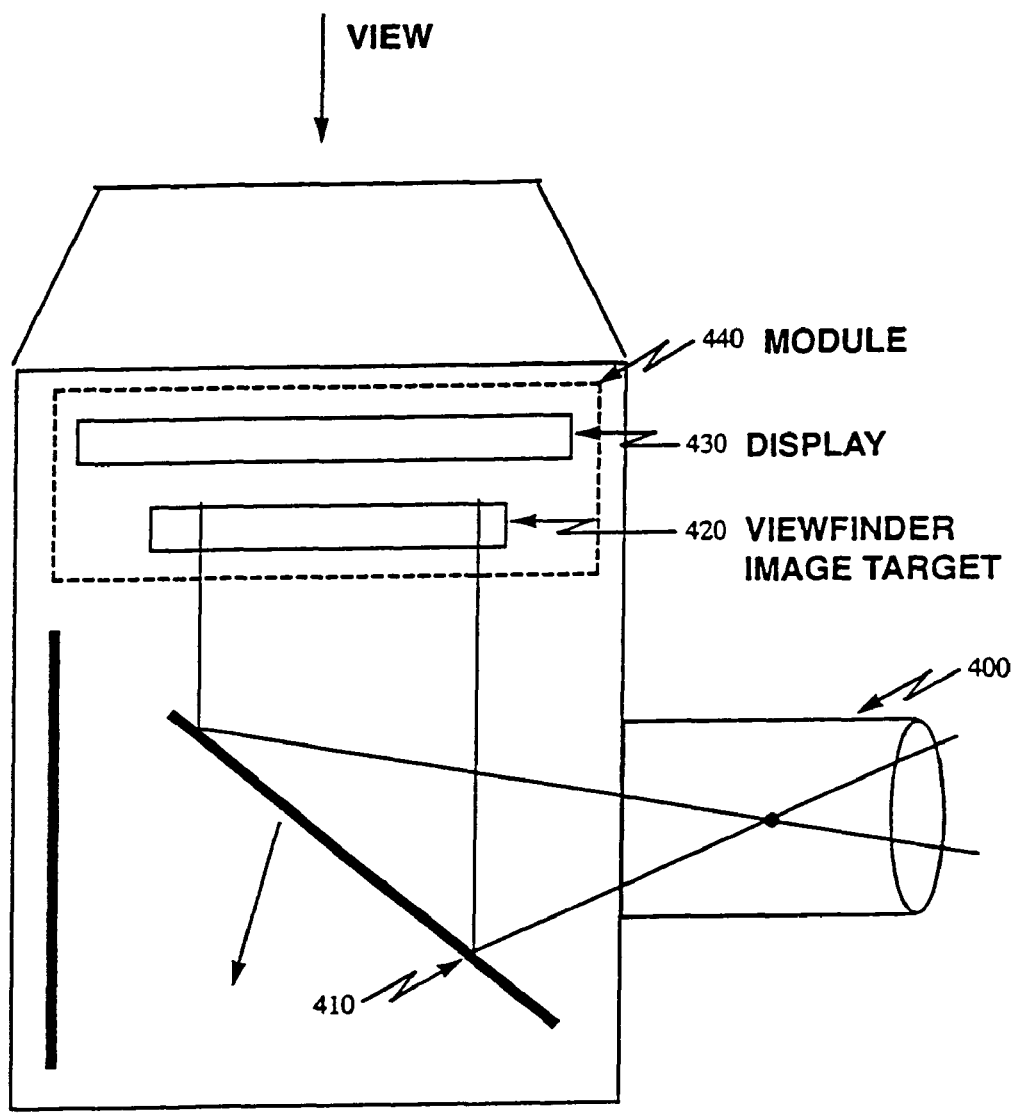
FIG. 4 is a cut away view of a single lens reflex camera with a modular electronic viewfinder.

FIG. 4 is a cut away view of a single lens reflex camera with a modular electronic viewfinder. As shown in FIG. 4, the image projected through the main image lens 400 is reflected off pivotable mirror 410 toward viewfinder image target 420 where the optical image is converted into electronic form for display on display 430. The display 430 is shown situated along top of the camera from where it may be viewed by a photographer. As the camera settings and adjustments are made, the photographer can see the impact of those settings on the actual image to be captured. When the photographer is satisfied with the adjustments, he "snaps" the picture which results in the pivotable mirror 410 being displaced out of the optical path which allows the image from objective lens 400 to be projected onto the image plane where it can be captured on either film or in electronic form. The dash line 440 surrounding the viewfinder image target 420 and the display is designed to indicate that these units are created as a module which can be replaced so that either a color viewfinder or a black and white viewfinder may be utilized.

A few sample embodiments will now be discussed to place the concepts of the invention in context. The first relates to a still, color electronic camera. Still color electronic cameras of the prior art currently have optical viewfinders which permit the scene to be viewed in color. In accordance with the invention, a black and white video camera would be utilized to provide a black and white viewfinder image when the front photographer desired to shoot in black and white. Alternatively, a full color image target could be used to capture the viewfinder image in color and then the color image would be converted from full color to black and white for display on the viewfinder display, such as 245 of FIG. 2.

Conversion from a red/green/blue color triad to a gray scale intensity required for display in black and white can be done using a look up table reflecting the characteristics of the phosphors utilized on the CRT. If a shadow mask CRT is not utilized, one would combine the values of red, green and blue from the video buffer into a single value for modulating an electron beam at that pixel location with the correct value of intensity. Conversions from hue, illumination and saturation color systems to black and white can be done similarly. Whatever representation is stored for displaying the color image can be converted into an appropriate set of intensity values representing the shades of gray associated with a gray scale display of a black and white image.

This conversion from color to black and white can be done after the picture has been taken. By capturing an image in full color using a color electronic target such as might be utilized for the film image through the main lens 200 in FIG. 2, one would tag the stored image as black and white preferred, which would invoke appropriate processing to convert from the color representation to the black and white representation to be displayed. This allows the photographer to retain the option of displaying the image in color or in black and white. As shown in FIG. 4, it would be desirable to use a single lens reflex technique so as the camera settings were adjusted to the photographer's preferences, the impact on the black and white image displayed on the black and white viewer shown in FIG. 4 would be immediately usable. Thus, the photographer would have a very good sense of what the actual image would look like when captured on film or captured electronically when the pivotable mirror is removed from the optical path.

A second sample embodiment will be discussed in conjunction with FIG. 3. The electronic back 310 has an electronic target 330 for capturing images from the objective lens and for storing them in electronic storage, not shown. The electronic target is typically a color target and the electronic viewfinder display 320 can be a color display with a black and white option. If the black and white option is invoked, then color information from the electronic target 330 can be converted to black and white, in the black and white mode, and displayed on the viewfinder display 320, the decision whether to store a particular image can be made once the viewfinder display has been reviewed to see if the results are satisfactory. In this mode, a user will take sample snapshots which will be discarded if unsatisfactory after reviewing the results of those snapshots in the electronic viewfinder display. However, if the photographer desired to set the camera on a time exposure setting and leave the shutter open for an extended period of time, the photographer could receive real time images through the objective lens and see them displayed on the electronic viewfinder display for purposes of setting the camera adjustments prior to taking the picture desired. Once the camera adjustments were made to the photographer's satisfaction, the shutter setting would be returned to normal and, optionally, one or more sample electronic snapshots taken using those settings to ensure that the results were those desired. If the snapshots were satisfactory as viewed on the electronic viewfinder display, then production images could be stored in the storage in the electronic back for later reproduction and use. In this embodiment, storage may be accomplished in color and the conversion to black and white occur later as desired.

Figure 5:
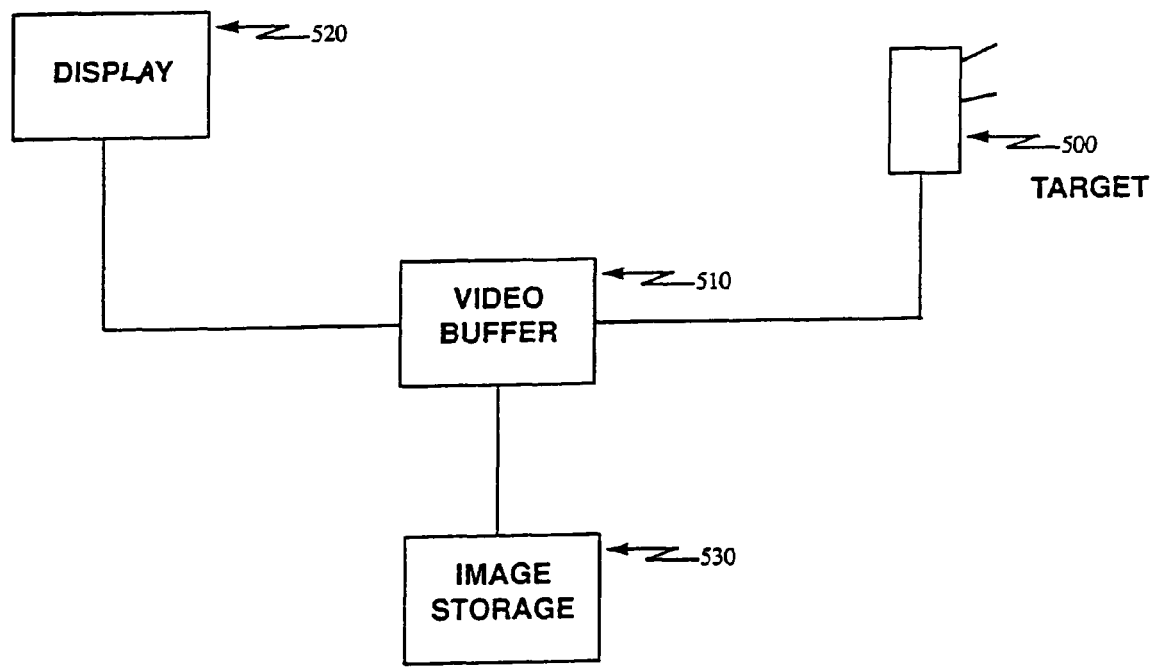
FIG. 5 is a block diagram of image capture, storage and display used with sample embodiment 2 (FIG. 3).

FIG. 5 is a block diagram of image capture, storage and display used with sample embodiment 2 (FIG. 3). The image target 500 is connected to video buffer 510 so that when a snapshot is taken, the output of the target is stored in video buffer 510. The video buffer contents are displayed on display 520 and, if found acceptable, are transferred to image storage 530 under control of the CPU.

If target 500 shown in FIG. 5 is a color target, it would be possible to treat each pixel of a color triad as a separate black and white pixel thus effectively tripling the pixel count for black and white images. In the display, for example, such a display could be fabricated by failing to add the color to a standard color flat panel and building custom drivers that would treat every former color pixel element (three element to a pixel) as an independent black and white pixel. This would result in tripling the pixel count. An analogous procedure could result in a high-definition black and white target for capturing the image, if the camera back is to be dedicated to black and white only.

The third sample embodiment relates to a single lens reflex film camera with black and white electronic viewfinder. This embodiment is for serious photographers interested in exploring or using the black and white medium. The camera would use standard 35 mm film, but would feature an electronic viewfinder. The target for the viewfinder would pick up its image from the lens, via the shutter-driven mirror, as is standard in 35 mm SLR cameras. (It could, alternately, pick up its image from a separate lens mounted adjacent to—typically directly above—the film lens.)

The image would be displayed on a high-definition flat panel. Typically, this might be mounted on top of the camera, with a lens that both magnifies the image and excludes extraneous light, similar to the system used by Rolex. When the shutter is released, the desired image would be captured on black and white film, inside the camera, exactly as is done in traditional photography.

The electronic viewfinder would be intimately tied into the controls of the camera, through the camera's computer. When the photographer first inserted the film, he or she would indicate to the viewfinder the characteristics of the film. Ideally, this would be automatically done by reading coding on the film. At the very least, the ASA of the film would be read. The photographer might pick from a menu or use other means to indicate the specific brand, and the viewfinder software would access detailed characteristics of the film, from a database and thus be able to accurately simulate results, such as the amount of grain. The viewfinder software would also receive input from the photographer's ASA setting (perhaps he intends to "push" the film), as well as such settings as time and exposure. Armed with this information, the software would filter the viewfinder image to closely replicate the actual expected output.

An example of the kinds of view information that would be presented the user would be persistence. A photographer wanting to take a picture of a waterfall, may want to smooth out the water by using a long exposure. Since the persistence of the viewfinder display is not only fixed but, of necessity, of short duration (to allow it to properly display fast-moving material), this smoothing must be done by the computer, typically by summing multiple frames.

Some filtering processes may prove to be unavoidably lengthy, particularly when using high resolution images. The photographer might wish to watch the processing of the images it develops during the image processing to get a sense of when more image processing ceases to be useful in terms of visual effect.

Alternatively, the photographer may wish to see a simulation of what the image would look like if the full processing were completed.

Figure 6:
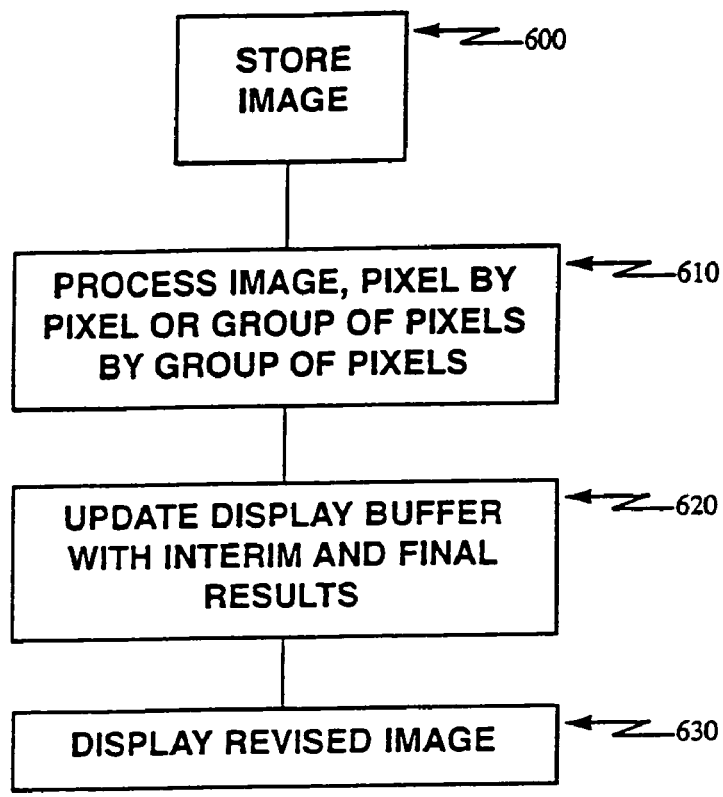
FIG. 6 is a flow chart of a process for displaying interim results of image processing functions while calculations are in progress.

FIG. 6 is a flow chart of a process of displaying interim results of image processing functions while calculations are in progress. A stored copy of the image is obtained (600) and image processing begun on a pixel by pixel basis or on a group of pixel by group of pixel basis (610). As calculation proceeds, the display buffer is updated with interim results as well as with a final result when it is obtained (620). This updating permits the display of the revised image at all stages of interim calculations (630).

Figure 7:
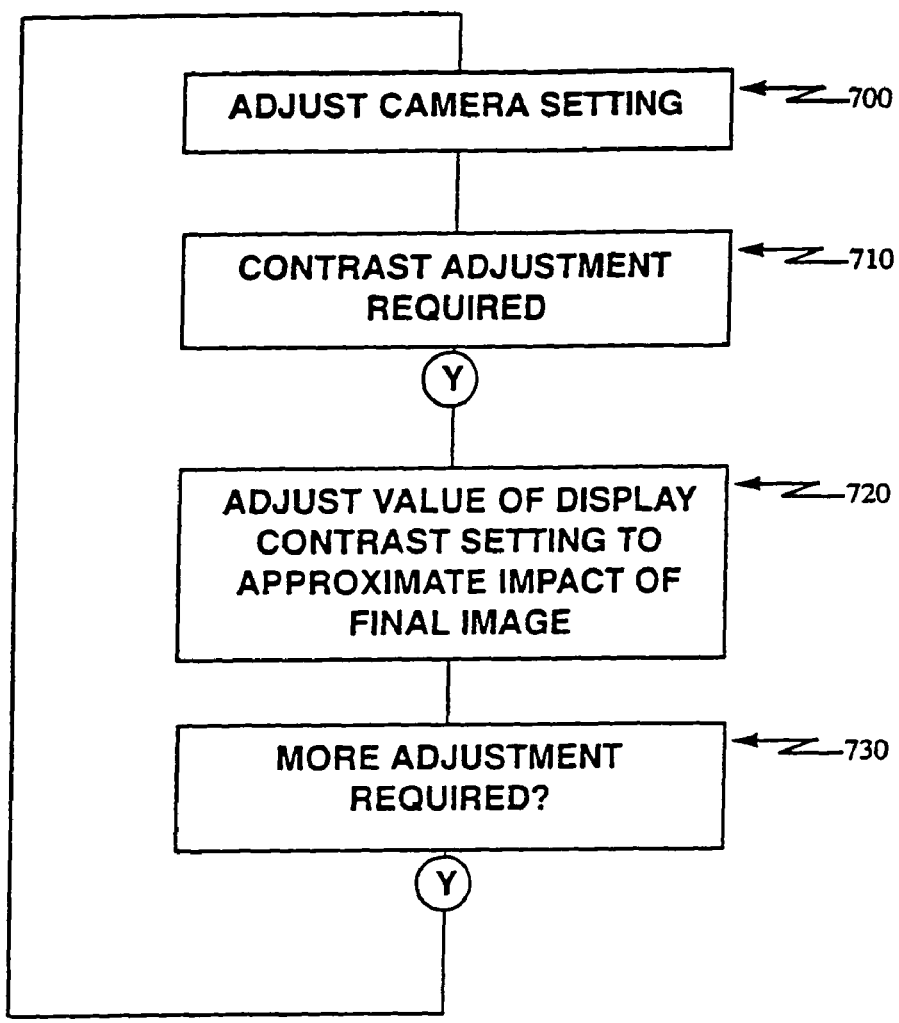
FIG. 7 is a flow chart of a simulation of results of image processing when adjusting camera settings.

FIG. 7 is a flow chart of a simulation of results of image processing when adjusting camera settings. This can be referred to as a "live" mode. The "live" mode should show most, if not all, the expected final characteristics, even if some must be approximated. To this end, most of the standard filtering would be accomplished in hardware. For example, changes in contrast would not be accomplished by having the microprocessor laboriously go through each pixel one at a time changing numeric values. Instead, the microprocessor would affect a contrast control, changing all pixels simultaneously without acting on the number stored for each individual.

In FIG. 7, an adjustment is made to a camera setting (700) and a determination made if a change to the setting results requires a contrast adjustment (710). If it does, the value of the display contrast is adjusted to approximate the impact of the change of camera settings on the final image (720). If more adjustment is required, (730) the process loops back to before block 700.

At least one reason today's film cameras feature the controls they do—primarily speed and aperture—is that photographers must have a mental model of what the results of those controls interacting will be. Having more than a few controls would tax the mind of any photographer to predict what the eventual interaction would produce. Having an electronic viewfinder of this sort would enable designers to add new controls, in the certain knowledge that the photographer could, in fact, see the eventual result. For example, a camera might feature a "persistence" control, rather than depending on the photographer to set time and aperture appropriately. Another control might affect resulting grain.

These new controls would not necessarily be slaved to the optics. The camera's computer would translate the desired results into commands fed to the optical controls.

For example, photographers might be offered a "magnify" option, that would show a small section of the image, as it would appear in a blow-up, demonstrating, in particular, the expected grain characteristics of the film. The accuracy of this mode could be increased by actually zooming the camera lens out to full extension to get the highest definition sample possible on which to overlay the expected film characteristics. When the photographer returned to normal mode, the lens would automatically retract to its previous position.

Figure 8:
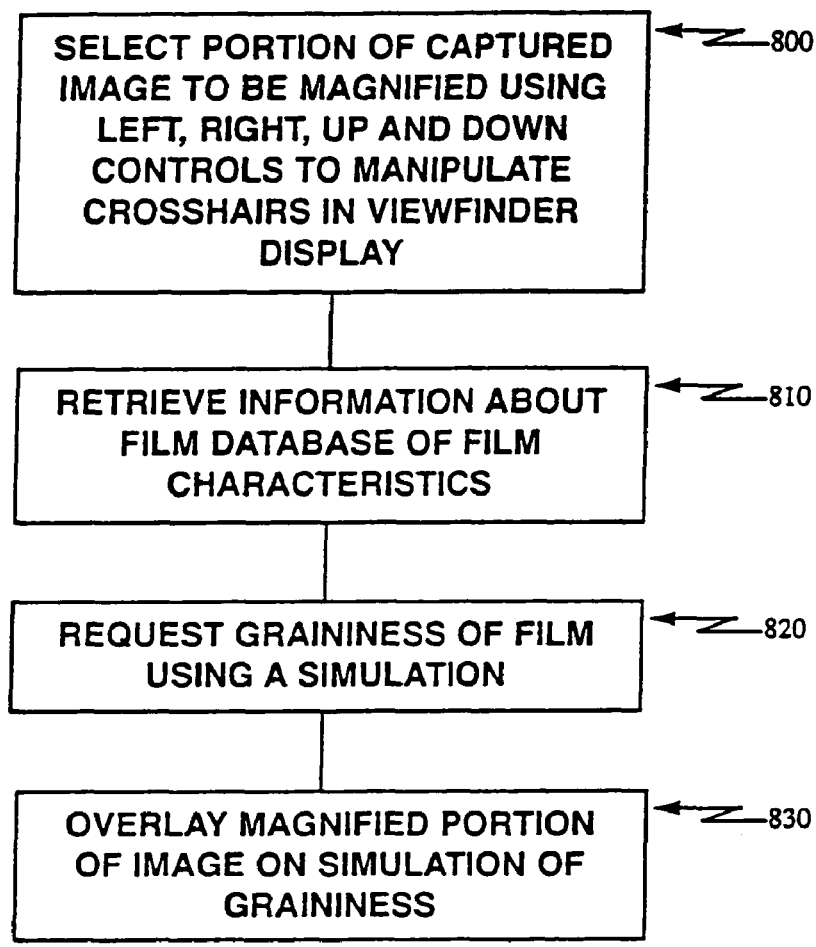
FIG. 8 is a flow chart of an exemplary new control permitted by the invention.

FIG. 8 is a flow chart of an exemplary new control permitted by the invention. As shown in FIG. 8, a portion of the captured image to be magnified is selected by positioning crosshairs over the portion desired using left, right, up and down controls to manipulate the crosshairs on the display of the viewfinder (800). Information about the film is retrieved from a data base of film characteristics, discussed more hereinafter (810) and a representation of the graininess of the film is created as part of a simulation. Such a representation of graininess might be an image pattern created by a fractal simulation of the grains of a film normally encountered (820). The magnified portion of the images are overlaid on the simulation of graininess to give an appearance of the images that would appear if greatly magnified.

Figure 9:
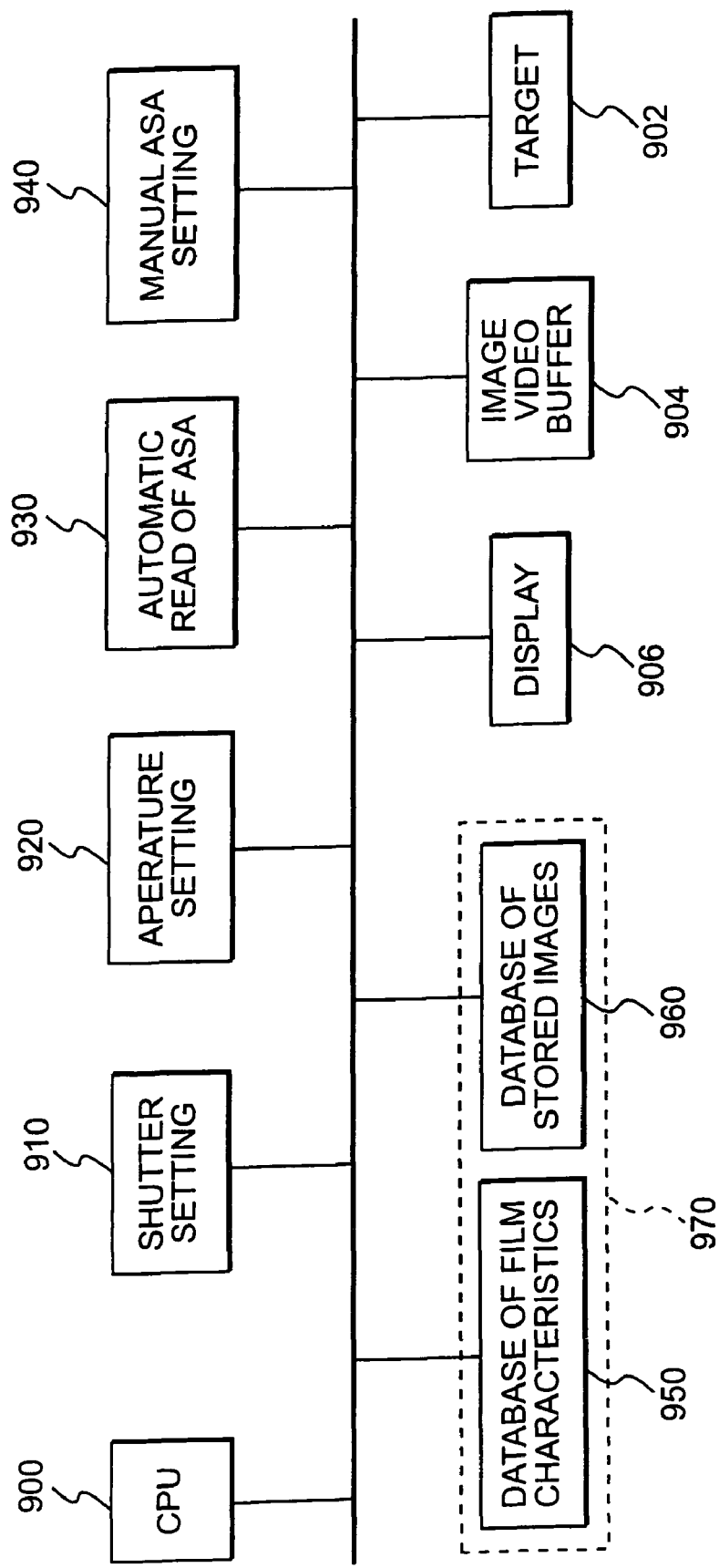
FIG. 9 is a block diagram of a computer used to control cameras in accordance with the invention.

FIG. 9 is a block diagram of a computer used to control cameras in accordance with the invention. CPU 900 executes all programs and controls the operation of a camera over bus. The camera senses the shutter setting (910) and the aperture setting (920), automatically reads the ASA of the film inserted (930), and detects the manual ASA setting (940). If the manual ASA setting differs from that automatically read at 930, the user will be prompted with the opportunity to override the automatic setting. This might be desirable as when a photographer desires to push the film by operating intentionally on a portion of its sensitivity characteristics which might produce a desired special effect.

The memory of the camera (970) includes, inter alia, a data base of film characteristics 950 and a data base of stored images (960).

A fourth sample embodiment is illustrated in FIG. 4. As shown in FIG. 4, the viewfinder image target 420 and display 430 are modularized so as to be replaceable. In this case, a color viewfinder could be swapped-out for a black and white viewfinder apparatus for an extensive period of black and white shooting. In the example shown in FIG. 4, the recording medium is a film medium. Although color viewfinders may have been utilized as a feature of electronic cameras, there does not appear to be any instance where they have been utilized for film cameras.

A fifth sample embodiment relates to an optional black and white viewfinder for color video cameras. Although black and white viewfinders for color cameras were common in the early days, due to the size and expense of color viewfinders, black and white viewfinders have pretty much disappeared. However, the intercutting of black and white with color has become a popular editing technique. By using the invention, videographers would be able to view a shot in black and white by enabling a switch to turn off the color in the display. Switching, could, at the same time force recording of black and white information only or, better, to record a code that would indicate to editing equipment that even though the images are stored in color, they should be displayed in black and white. This would permit the black white-color decision to be revisited later.

A sixth sample embodiment utilizes a black and white viewfinder option for moving film cameras. This is similar in many respects to the characteristics of the still camera embodiment. The viewfinder enables the cinematographer to view a highly-representative image of the final film image "through the lens" at the time of shooting. Having a black and white camera attached to a VCR and to a monitor which captures the same scene as a film camera is pretty much standard operating procedure today. The camera, however, does not typically see the same scene as the film, nor is the picture corrected for the settings of the film camera, nor is the monitor normally placed where a cinematographer can see it while shooting the picture. These deficiencies are overcome by having a black/white display or a black/white option on a color display.

In the seventh sample embodiment, a color viewfinder option for moving film cameras having a black/white option would be implemented. This option would share the characteristics of the color still camera viewfinders discussed above.

Figure 10:
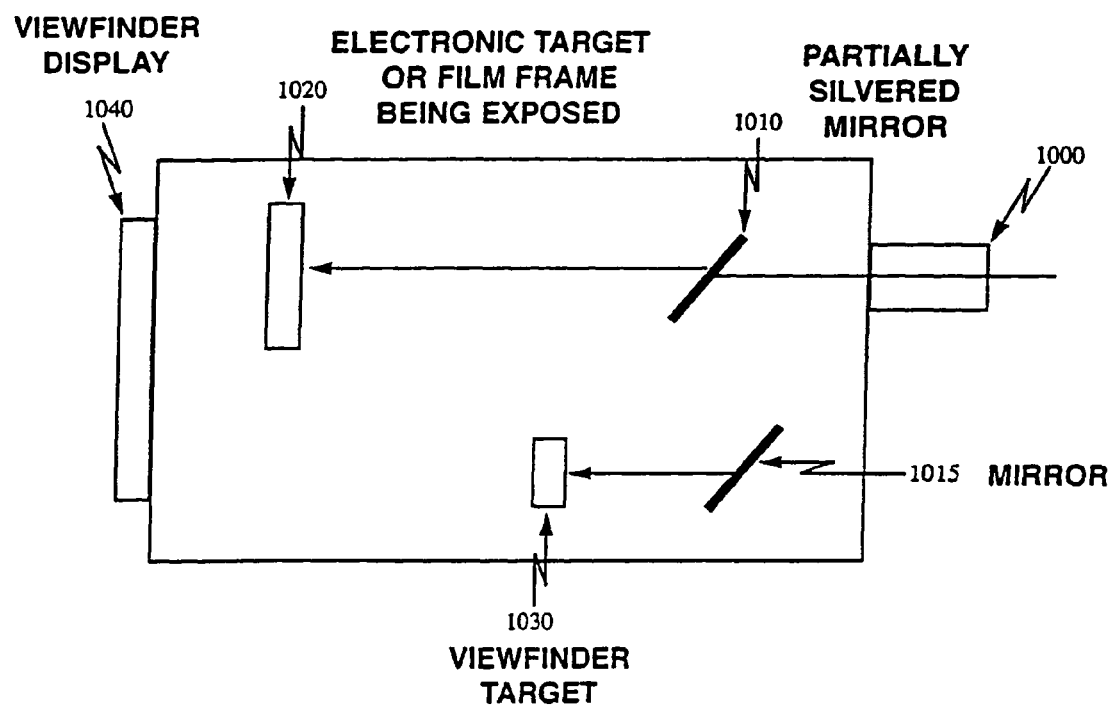
FIG. 10 is a cut away view of a moving picture camera and associated viewfinder.

FIG. 10 is a cut away view of a moving picture camera and associated viewfinder. The optical path is shown entering objective lens 1000 and passing through partially silvered mirror 1010 in order to reach either an electronic target or the film frame being exposed at 1020. The partially silvered mirror 1010 reflects a portion of the incoming light onto mirror 1015 where it is reflected onto viewfinder target 1030. In the embodiment shown, viewfinder target 1030 is linked to viewfinder display 1040 to display the incoming image for the camera person's view. If an electronic target is used for the image plane at 1020, then the viewfinder display 1040 may be linked to that target for purposes of capturing a copy of the image for viewing rather than requiring a viewfinder target 1030.

The camera shown in FIG. 10 can be used with color or black and white viewfinder options and it can be used with either a film or electronic target.

In the manner indicated, the problems of prior art cameras, particularly when utilized with black and white film are overcome.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

The invention claimed is:

1. A computer controlled still camera, comprising:
   a computer for controlling shutter speed and aperture during the capture of optical images on film using the camera in response to camera control settings;
   one or more image targets for converting an optical image into an electronic still image; and
   a viewfinder display for displaying an image from an image target,
   wherein,
   the image can be modified while being displayed to reflect changes to the image occurring as a result of image processing in the computer, said image processing occurring to simulate adjustment to settings of the camera, according to characteristics of at least one of a shutter setting, an aperture setting, and a film.

2. The camera of claim 1 in which said computer is configured to perform image processing on said electronic still image to create a processed image for storage.

3. The camera of claim 1 in which the image is a high-definition image obtained by treating each pixel of a color triad as a separate black and white pixel in said one or more image targets.

4. The camera of claim 1 in which one or more of said image targets are black and white targets for capturing the image when said viewfinder display is a black and white display.

5. The camera of claim 1 in which said viewfinder previews an actual image to be captured as a result of said image processing in terms of image effect.

6. The camera of claim 5 in which the image effect includes at least one of contrast, filtering, and magnifying.

7. The camera of claim 1 in which images are captured in black and white and are displayed in black and white.

8. The camera of claim 1 in which information about the film is retrieved from a data base of film characteristics to be able to accurately simulate a result of said image processing.

9. A method of using a computer controlled camera which includes a memory and a processor running a program which performs the steps of:
   capturing a still image in electronic form in the memory;
   displaying said still image on a display screen;
   modifying said still an electronic still image converted by the computer while being displayed to reflect changes to the still image occurring as a result of image processing, said image processing occurring to simulate adjustment to settings of the camera, according to characteristics of at least one of a shutter setting, an aperture setting, and a film, and
   storing the modified electronic still image in the memory.

10. The method of claim 9 in which the image is a high-definition image obtained by treating each pixel of a color triad as a separate black and white pixel in said one or more image targets.

11. The method of claim 9 in which said image is black and white for capturing the image when said display is a black and white display.

12. The method of claim 9 in which said image previews an actual image to be captured as a result of said image processing in terms of image effect.

13. The method of claim 12 in which the image effect includes at least one of contrast, filtering, and magnifying.

14. The method of claim 9 in which the still images are captured in black and white and are displayed in black and white.

15. The method of claim 9 in which information about the film is retrieved from a data base of film characteristics to be able to accurately simulate a result of said image processing.

16. A computer controlled still camera, comprising:
   a computer for controlling shutter speed and aperture during the capture of optical images using the camera in response to camera control settings;
   one or more image targets for converting an optical image into an electronic still image; and
   a display for displaying an image from an image target,
   wherein,
   the image can be modified displayed to reflect changes to the image occurring as a result of image processing in the computer, said image processing occurring to simulate adjustment to settings of the camera, according to characteristics of at least one of a shutter setting, an aperture setting, and a film.

17. The camera of claim 16 in which said computer is configured to perform image processing on said electronic still image to create a processed image for storage.

18. The camera of claim 16 in which the image is a high-definition image obtained by treating each pixel of a color triad as a separate black and white pixel in said one or more image targets.

19. The camera of claim 16 in which said one or more image targets are black and white targets for capturing the image when said viewfinder display is a black and white display.

20. The camera of claim 16 in which said viewfinder previews an image to be captured as a result of said image processing in terms of image effect.

21. The camera of claim 20 in which the image effect includes at least one of contrast, filtering, and magnifying.

22. The camera of claim 16 in which images are captured in black and white and are displayed in black and white.

23. The camera of claim 16 in which information about the film is retrieved from a data base of film characteristics to be able to accurately simulate a result of said image processing.

* * * * *